United States Patent [19]
Brunius et al.

[11] Patent Number: 6,114,955
[45] Date of Patent: Sep. 5, 2000

[54] SYSTEM AND METHOD FOR ANTENNA FAILURE DETECTION

[75] Inventors: Robert E. Brunius, Mahtomedi; John R. Charais, St. Paul, both of Minn.

[73] Assignee: Interactive Technologies, Inc., North St. Paul, Minn.

[21] Appl. No.: 09/090,108

[22] Filed: Jun. 3, 1998

[51] Int. Cl.$^7$ ............................................... G08B 1/08
[52] U.S. Cl. ...................... 340/539; 340/506; 340/511; 340/286.02; 340/292; 455/67.4
[58] Field of Search ..................... 340/506, 539, 340/511, 531, 286.02, 292; 455/67.4; 343/703

[56] References Cited

U.S. PATENT DOCUMENTS

| | | | |
|---|---|---|---|
| 3,618,083 | 11/1971 | Burley et al. | 340/539 |
| 4,554,410 | 11/1985 | Furumoto | 179/2 E |
| 4,603,325 | 7/1986 | Marino et al. | 340/539 |
| 5,160,915 | 11/1992 | Kiss | 340/552 |
| 5,294,934 | 3/1994 | Matsumoto | 342/173 |

FOREIGN PATENT DOCUMENTS

| | | |
|---|---|---|
| 43 34 216 A1 | 4/1995 | Germany . |
| 2 024 568 | 1/1980 | United Kingdom . |
| 2 314 485 | 12/1997 | United Kingdom . |

*Primary Examiner*—Daryl Pope
*Attorney, Agent, or Firm*—Fish & Richardson P.C., P.A.

[57] ABSTRACT

In a wireless security system, the system controller includes one or more antennas for reception of signals from remote sensor-transmitter units. To detect antenna failure, the system controller generates a test signal with a known parameter and transmits this test signal via a first antenna. The system controller then measures the parameter of the corresponding test signal received, if any, via a second antenna, and compares the parameter of the corresponding test signal received to a predetermined threshold parameter. When the parameter of the test signal received via the second antenna differs from the threshold by a predetermined amount, or predetermined margin for error, an antenna failure message is generated.

50 Claims, 5 Drawing Sheets

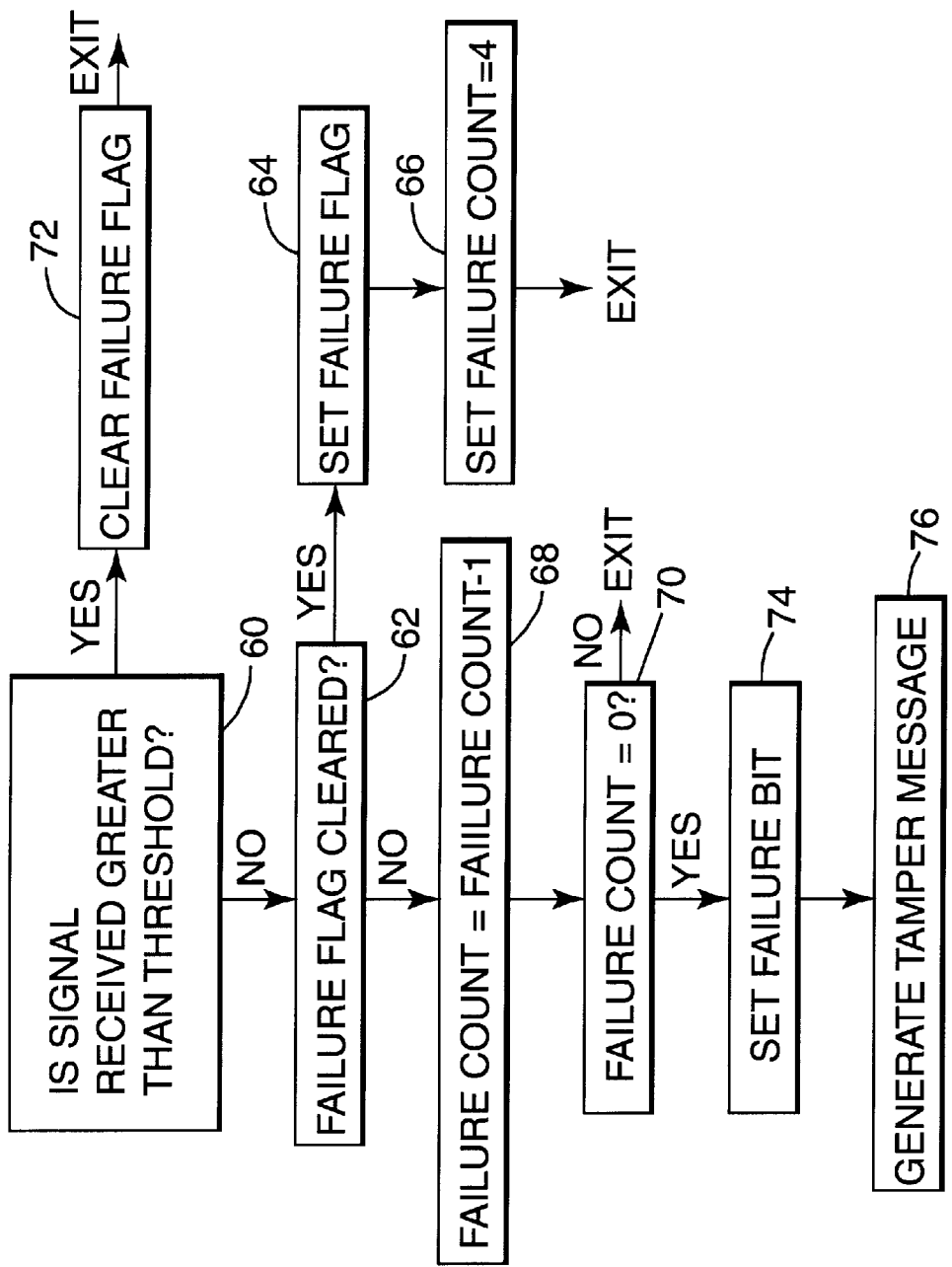

SYSTEM AND METHOD FOR ANTENNA FAILURE DETECTION

TECHNICAL FIELD

The present invention relates to antenna failure detection, including antenna failure detection in a wireless security system.

BACKGROUND INFORMATION

Wireless security systems include one or more sensor-transmitter units, placed remotely throughout the premises, that communicate with a system controller. The sensors monitor various conditions that may constitute a threat to security, such as fire, smoke, glass breakage, motion, forced entry, or other conditions. The transmitters send operating signals to the system controller, conveying information as to status or conditions at the sensor-transmitter. For example, when a sensor detects a security condition, its corresponding transmitter sends an alarm signal to the system controller.

The system controller is typically mounted on a circuit board and enclosed by a metal box or casing. This physical manifestation and arrangement of the system controller is often called the control panel. The control panel is usually placed in a relatively interior location on the premises such as the basement or a closet.

The system controller interprets the operating signals, including alarm signals, sent by the sensor-transmitter units. For example, in response to an alarm signal, the system controller may send an alarm notification message via a telecommunications link such as the local telephone network, to a central station, whereby the police, fire department, or other appropriate agency is notified.

Another type of operating signal transmitted by the transmitters in the wireless security system is a supervisory signal, indicating to the system controller that the sensor-transmitter unit continues to be operable. In response to the supervisory signal, the system controller can notify the security system user if and when a sensor-transmitter unit is not functioning, so that the user can take corrective action to prevent an undetected breach of security in the future.

The system controller includes one or more antennas, for the reception of operating signals transmitted to it by the transmitters. The antennas are essential to the proper operation of the security system. If a transmitter sends a message indicating an alarm or other change of condition, the message must be received by the system controller. An antenna is necessary for such reception. The antenna converts the operating signal sent by the transmitter, from an electromagnetic wave propagating through the atmosphere into an electrical signal recognizable by a receiver.

One antenna alone is sometimes sufficient for the system controller to receive properly a signal from a transmitter. However, sometimes a signal cannot be received at a particular point in space because it is nullified or cancelled at that point, for example by another signal or by the effects of multipath distortion due to signal scattering in the local premise. The likelihood of proper signal reception by the system controller may be enhanced by utilizing two or more antennas, spaced apart from one another in such a manner as to create multiple points of possible reception, or spatial diversity. In such a spatial diversity receiver system, if a signal is cancelled at the location of one particular antenna, the signal could be received by another antenna at a different location.

SUMMARY

The present invention is directed to a system and method for detecting antenna failure. The invention has application in wireless security systems, but is not so limited. The system and method make use of a spatial diversity receiver system including multiple antennas, at least one of which is used for the transmission of signals, to detect failure of one or more of the antennas.

Avoidance of antenna failure is a significant concern. An antenna may fail for several reasons. For example, an intruder on the premises may attempt to disable the security system in order to avoid detection. One way to disable the system would be to disable the system controller. The system controller is often placed in a remote location on the premises and may be enclosed in a case or housing that provides some degree of protection against an intruder attempting to disable or destroy the system controller circuitry. However, if the intruder were to disable the system controller antenna or antennas, the ability of the system controller to receive security messages from the remote transmitter could be eliminated, even if the internal circuitry of the system controller were left intact. Other possible reasons for antenna failure include accidental tampering with the antenna, manufacturing defects, environmental conditions, or any number of other factors. Regardless of the cause of the antenna failure, there is a need to detect promptly the failure of an antenna and notify the security system user of the failure.

In a first embodiment, the present invention provides a system for detecting failure of an antenna, comprising a first antenna; a transmitter, operatively coupled to the first antenna, for transmitting a test signal via the first antenna; a second antenna; a receiver, operatively coupled to the second antenna, for receiving via the second antenna the test signal transmitted via the first antenna; and a control circuit operatively coupled to the transmitter and the receiver, the control circuit causing the transmitter to transmit the test signal via the first antenna, comparing a parameter of the test signal received by the receiver via the second antenna to a threshold parameter, and generating a message indicative of antenna failure when the parameter of the test signal received by the receiver differs from the threshold parameter by a predetermined amount.

In a second embodiment, the present invention provides an apparatus for detecting failure of an antenna, comprising means for controlling the transmission of a test signal via a first antenna; means for receiving via a second antenna the test signal transmitted via the first antenna; means for comparing a parameter of the test signal received via the second antenna to a threshold parameter; and means for generating a message indicative of antenna failure.

In a third embodiment, the present invention provides an apparatus for detecting an alarm signal indicative of an alarm condition and reporting the alarm condition to a central station, comprising a first antenna; a transmitter operatively coupled to the first antenna; a second antenna; a receiver operatively coupled to the second antenna, the receiver and the second antenna being oriented to receive the alarm signal indicative of an alarm condition; and a central processing unit operatively coupled to the transmitter and the receiver, the central processing unit processing the alarm signal and reporting the alarm condition to a central station, and the central processing unit causing the transmitter to transmit a test signal via the first antenna and reporting to the central station a condition indicating antenna failure when a parameter of a corresponding test signal received by the receiver differs from a threshold parameter by a predetermined amount.

In a fourth embodiment, the present invention provides a method of detecting failure of an antenna, comprising transmitting a test signal via a first antenna; receiving the test signal via a second antenna; comparing a parameter of the test signal received via the second antenna to a threshold parameter; and generating a message indicative of antenna failure when the parameter of the test signal received differs from the threshold parameter by a predetermined amount.

In a fifth embodiment, the present invention provides an apparatus for detecting alarm signals indicative of an alarm condition and reporting the alarm condition to a central station, comprising a control panel; a first antenna mounted on the control panel; a transmitter operatively coupled to the first antenna; a second antenna mounted on the control panel; a receiver operatively coupled to the second antenna; and a control circuit mounted on the control panel for controlling the transmission of a test signal by the transmitter, detecting reception of the test signal by the receiver, comparing a parameter of the test signal received to a threshold parameter, and generating a message indicative of antenna failure when the parameter of the test signal received differs from the threshold parameter by a predetermined amount.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a flow diagram illustrating operation of an antenna failure detection system and method.

Like reference numbers and designations in the various drawings indicate like elements.

DETAILED DESCRIPTION

Figure 1:
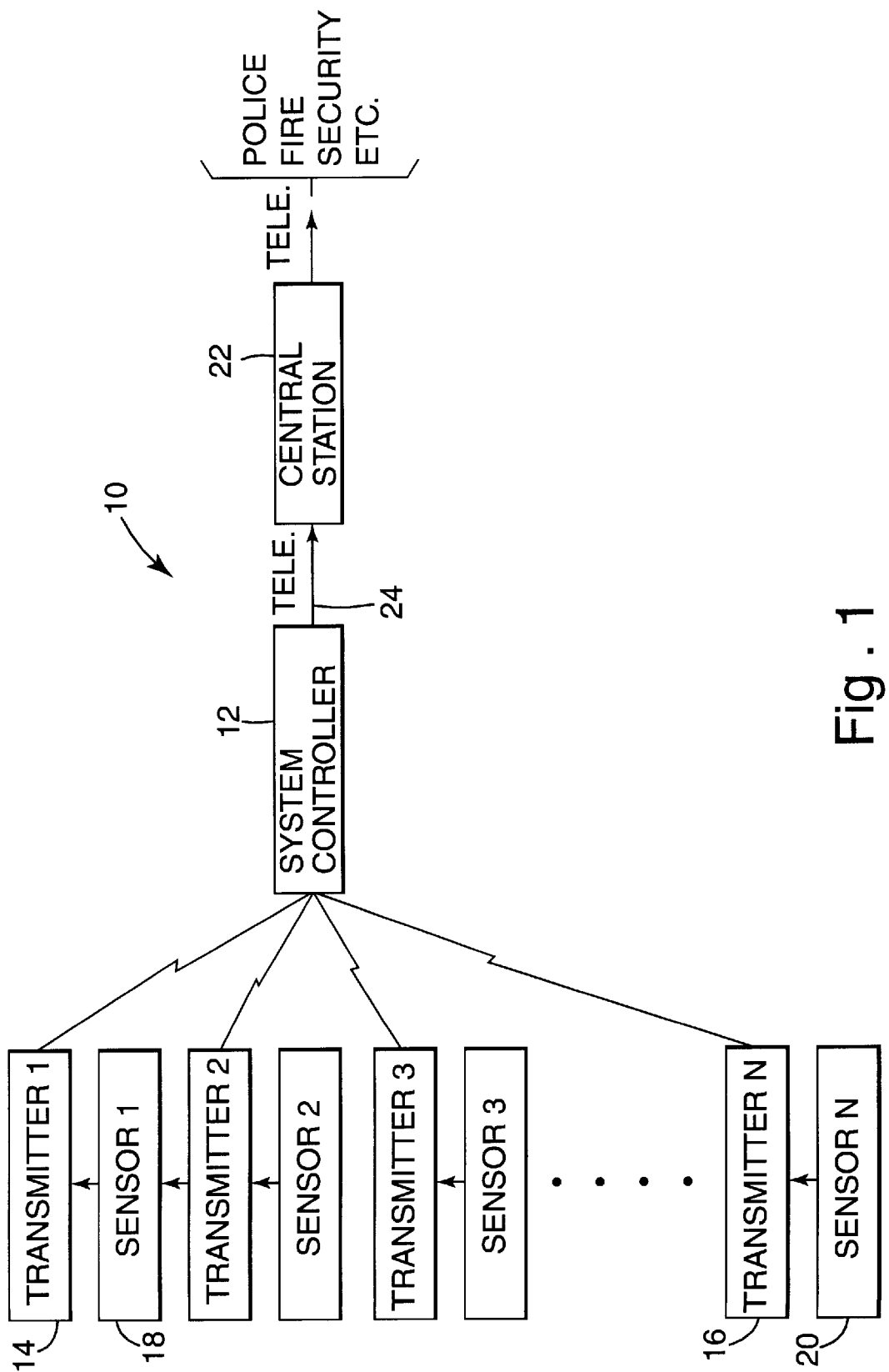
FIG. 1 is a block diagram of a wireless security system.

FIG. 1 is a block diagram of a wireless security system 10. Wireless security system 10 includes a system controller 12 that receives communications from a plurality of transmitters 14, 16 each having at least one associated sensor 18, 20. Any number of transmitters and associated sensors can be used, and the number used will often vary widely depending on the application of the wireless security system 10. For example, in an apartment or home, five to twenty sensors 18, 20 and transmitters 14, 16 may be used, whereas in an industrial or warehouse application hundreds of sensors 18, 20 and transmitters 14, 16 may be used. The sensors 18, 20 can be realized by any of a wide variety of known sensors, including motion detectors, door/window contacts, smoke detectors, and sound detectors.

The transmitters 14, 16 and associated sensors 18, 20 are placed at locations on the premises remote from the system controller, at various selected security points. The transmitter 14 associated with sensor 18 generates operating signals containing information regarding the associated sensor 18, including whether the associated sensor 18 has detected an alarm condition. In one embodiment, such operating signals are encoded radio-frequency (RF) signals. The transmitter 14 may also generate operating signals, indicating to system controller 12 that transmitter 14 and associated sensor 18 are functioning properly. These particular operating signals are often referred to as supervisory signals.

System controller 12 receives the messages transmitted by transmitter 14, and generates responses based on the content of those messages. For example, if the message indicates an alarm condition, system controller 12 may generate a visual or sound alarm, or may report a security condition to a central station 22 via telecommunications link 24, resulting in notification of the appropriate authority such as the fire department, police department, or a private security monitoring agency. Telecommunications link 24 may be an ordinary land telephone line, or it may be a cellular communication link, or some other telecommunications path.

Thus, it can be seen that system controller 12 plays an essential role in the operation of wireless security system 10. It is imperative that signals transmitted by transmitter 14 are received properly by system controller 12, if alarm conditions indicating a breach or danger to security are to be discovered.

Figure 2:
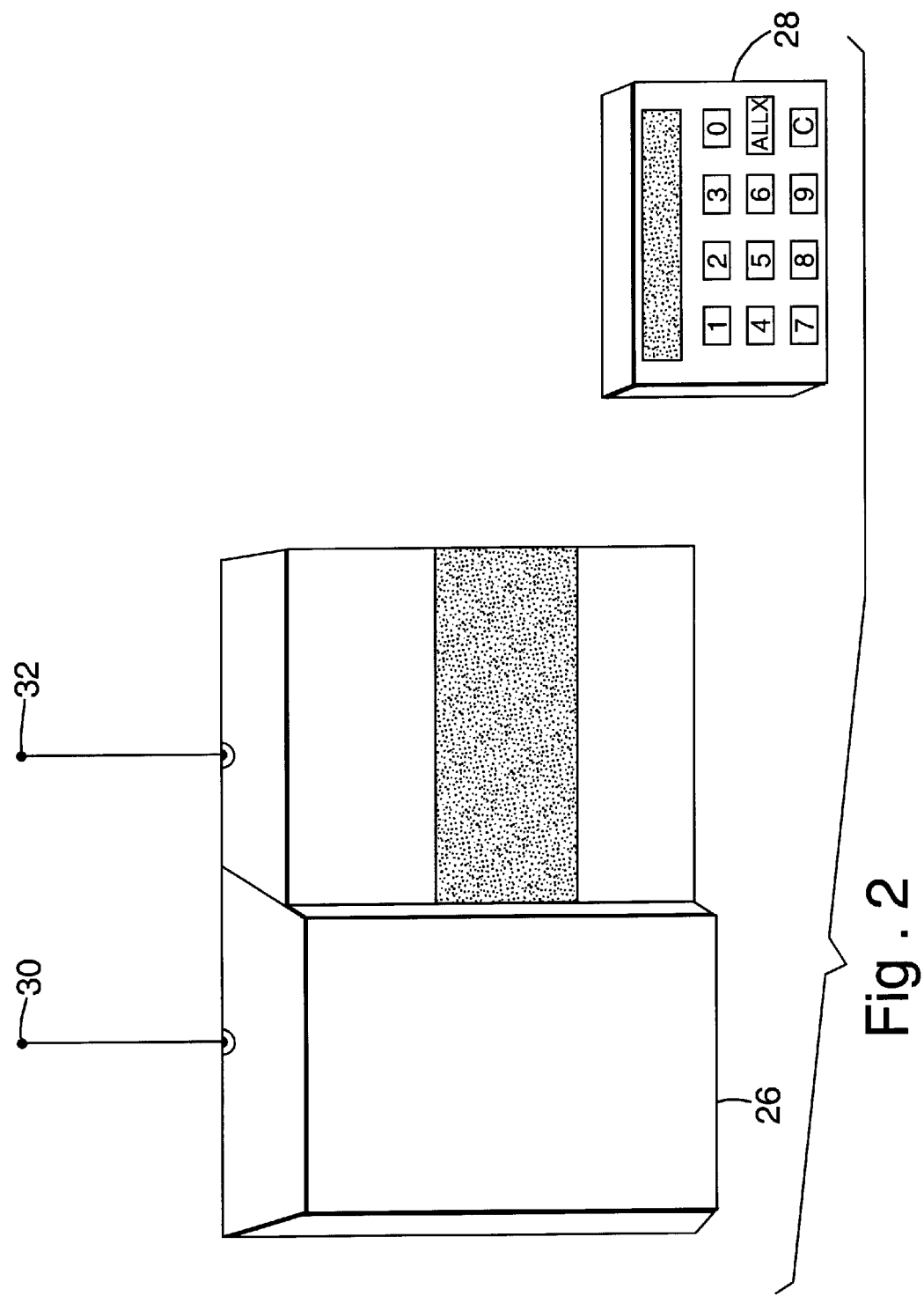
FIG. 2 is a diagram of a control panel and corresponding interface.

FIG. 2 is a diagram of a control panel 26 and corresponding interface 28. The control panel 26 includes system controller 12 mounted on a circuit board and surrounded by a case or housing, which is a typical industrial configuration. The control panel 26 may also have a corresponding interface 28 allowing the user of wireless security system 10 to enable or disable all or part of the wireless security system 10 via the control panel 26. In the embodiment shown in FIG. 2, interface 28 is a touchpad entry unit with digital display. Other interfaces could be used with the present invention.

Typically, a code is required to enable or disable wireless security system 10, and a command to enable the system will typically take effect only after the elapse of a delay period. For example, prior to leaving the premises, the user may enter the proper code on the touchpad of interface 28 in order to enable the security system 10, and the system's predetermined delay period will be sufficient to allow the user to exit the premises before the system is enabled. When the user later returns and reenters the premises, one of the plurality of sensors 18, 20 may detect an alarm condition. The associated transmitter 14, 16 will thus send an alarm signal to system controller 12. However, system controller 12 will delay a predetermined period before notifying the central station 22 of the alarm. This delay period should be sufficient to allow the user to enter the premises, go to the control panel interface 28, and enter the proper code to disable the appropriate part of the system before the system controller 12 sends out an alarm signal to the central station 22.

However, it is also possible that an intruder could disable the system controller 12 before the system controller 12 notifies the central station 22 of an alarm. As an alternative to entering the proper code at interface 28, the intruder could attempt to tamper with the control panel 26 in order to impede its ability to receive alarm messages from the transmitters 14, 16. One method to impede reception would be to tamper with or destroy antennas 30 and 32. The present invention provides protection against such tampering or destruction.

Figure 3:
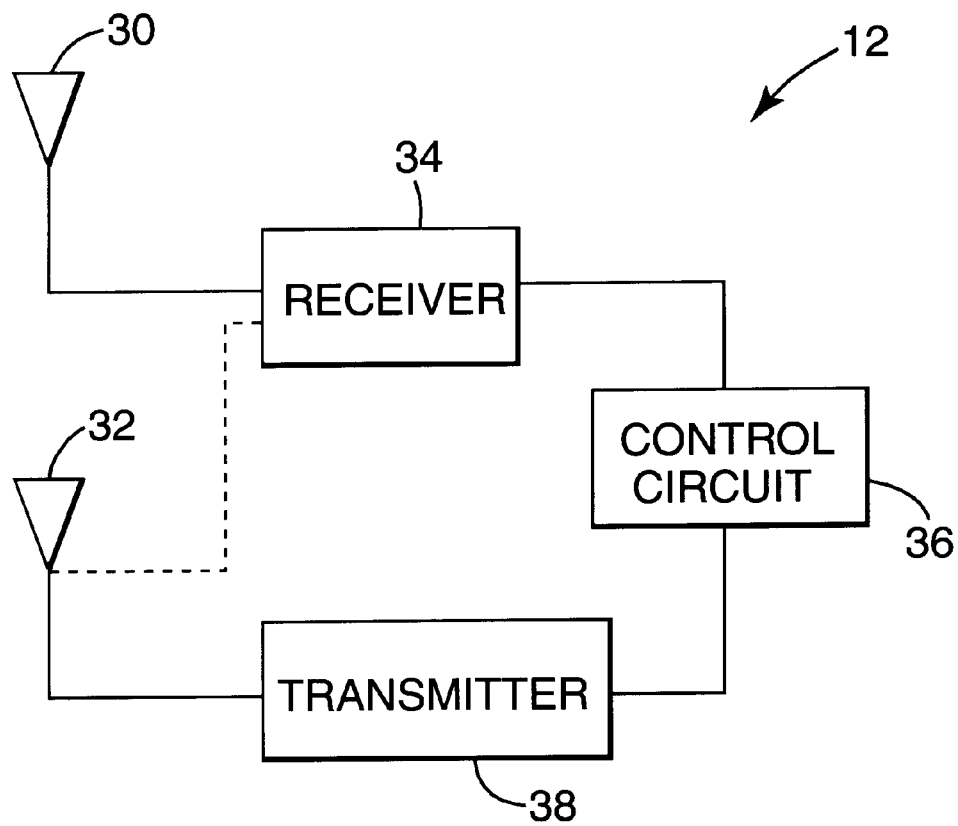
FIG. 3 is a block diagram of an antenna failure detection system.

FIG. 3 is a block diagram of an antenna failure detection system. A function of the system controller 12 is to receive and process operating signals from the plurality of transmitters 14, 16 and associated sensors 18, 20. Thus, the system controller 12 includes a receiver 34 that receives signals via antenna 30. Antenna 30 may be arranged with one or more additional antennas, such as antenna 32, in a spatial diversity configuration. Physically, antenna 30 can be realized in a variety of ways, including a straight, external metal projection, a curved projection, or a wire. The antenna 30 could alternatively be enclosed within non-metallic housing, and could be realized on a circuit board, along with other system controller 12 circuitry, contained within control panel 26. Typically, antenna 30 is an external projection, multi-directional antenna. In one embodiment of the invention, signals can also be received via antenna 32, thereby constituting a spatial diversity system for receiving signals. In another embodiment of the invention, antennas 30 and 32 are spaced not more than two feet from one another, and in yet another embodiment antennas 30 and 32 are both mounted on a single control panel. Alternatively, in another embodiment of the invention, antenna 30 may be positioned at a location remote to control panel 26.

Receiver 34 receives via antenna 30 a signal sent by transmitter 14 associated with sensor 18, and receiver 34 delivers the signal or a signal proportional thereto, to a control circuit 36. Control circuit 36 interprets the signal, determining from which sensor 18, 20 the signal was sent, and whether the signal indicates an alarm condition, a supervisory status, or conveys some other information. In some embodiments of the invention, multiple alarm signals or an alarm signal of a minimum duration must be received from the transmitters 14, 16 associated with sensors 18, 20 in order for the system controller 12 to generate an alarm message and notify central station 22. The control circuit 36 determines whether a sufficient number of alarm messages have been received or a sufficient duration has elapsed so as to notify central station 22 of the existence of an alarm condition. Control circuit 36 directs system controller 12 to notify central station 22 of an alarm condition if appropriate. In one embodiment, the functions of determining whether to generate an alarm message and notifying the central station with such alarm message are performed by a microprocessor programmed with software. Alternatively, the determining and notifying functions can be performed by discrete logic circuitry or by other means.

Because antenna 30, and in some embodiments antenna 32, is essential to proper reception of the signal sent by transmitter 14 and associated sensor 18, one way to disable the wireless security system 10 is to destroy or tamper with antennas 30 and/or 32 of the system controller 12. Such destruction or tampering is possible, either intentionally or unintentionally, because antennas 30 and 32, unlike other parts of the system controller 12, are typically external to the control panel and thus exposed without protection. The system of FIG. 3 provides protection against destruction or tampering with antennas 30 and 32 by monitoring antennas 30 and 32 for tampering and periodically or randomly notifying control circuit 36 of the status of antennas 30 and 32.

System controller 12 also includes a transmitter 38 for transmitting test signals via antenna 32. Transmissions of transmitter 38 are controlled by control circuit 36. When control circuit 36 directs transmitter 38 to send a test signal via antenna 32, control circuit 36 waits for receiver 34 to receive the test signal via antenna 30 and to relay the test signal, or a signal directly proportional thereto, to control circuit 36. Control circuit 36 then compares a selected parameter of the signal relayed to it to a threshold parameter that is based on the test signal that was sent. The parameter may be a value based on, for example, signal power or signal voltage, or other measurable characteristics of a signal. If the parameter of the signal received is within some predetermined range of the threshold, such as above some minimum voltage, then the control circuit 36 has verified that antenna 30 and antenna 32 are functioning properly. If the parameter of the signal received is outside the required range, such as below a minimum voltage, or if no signal at all is received for some predetermined duration, this indicates failure of antenna 30 and/or antenna 32. A margin for error is typically selected in determining the threshold. This margin can be implemented either by designating the threshold itself as a range rather than a particular value, or by taking into account a range of deviation from the threshold during the comparison of the signal parameter to the threshold.

Antenna failure can be indicated to central station 22. In one embodiment system controller 12 sends a message to central station 22 indicating antenna tampering after a predetermined number of antenna failures. In another embodiment, system controller 12 sends a message to central station 22 indicating antenna tampering after the average, or mean value, of the measured parameter of the received signals is outside the acceptable threshold range. Besides averaging, a number of other different arithmetic operations could be performed on the measured parameter of the received signals before determining whether to send a message indicating antenna tampering. In one embodiment, for example, more than three test signals are transmitted, and the highest and lowest measured parameters are thrown out, or ignored, in determining whether to send a message indicating antenna tampering.

Receiver 34 also may receive operating signals from remote transmitters 14, 16 via antenna 30 indicating the status of the remote transmitters 14, 16 and associated sensors 18, 20. In another embodiment of the invention, antenna 32 is also configured for the reception of operating signals from remote transmitters 14, 16, being operatively coupled to receiver 34 or some other receiver. The system controller 12 may be configured so as to prevent the transmission of test signals simultaneous to the reception of operating signals from remote transmitters 14, 16. The system controller 12 may also be configured so as to abort the transmission of a test signal upon reception of an operating signal via antenna 30 and/or antenna 32. In yet another embodiment, antennas 30 and/or 32 may be configured to transmit signals to remote receivers which are coupled to transmitters 14, 16. These receiver-transmitters, or "transceivers," may thus receive information such as control or status information from control circuit 36.

Figure 4:
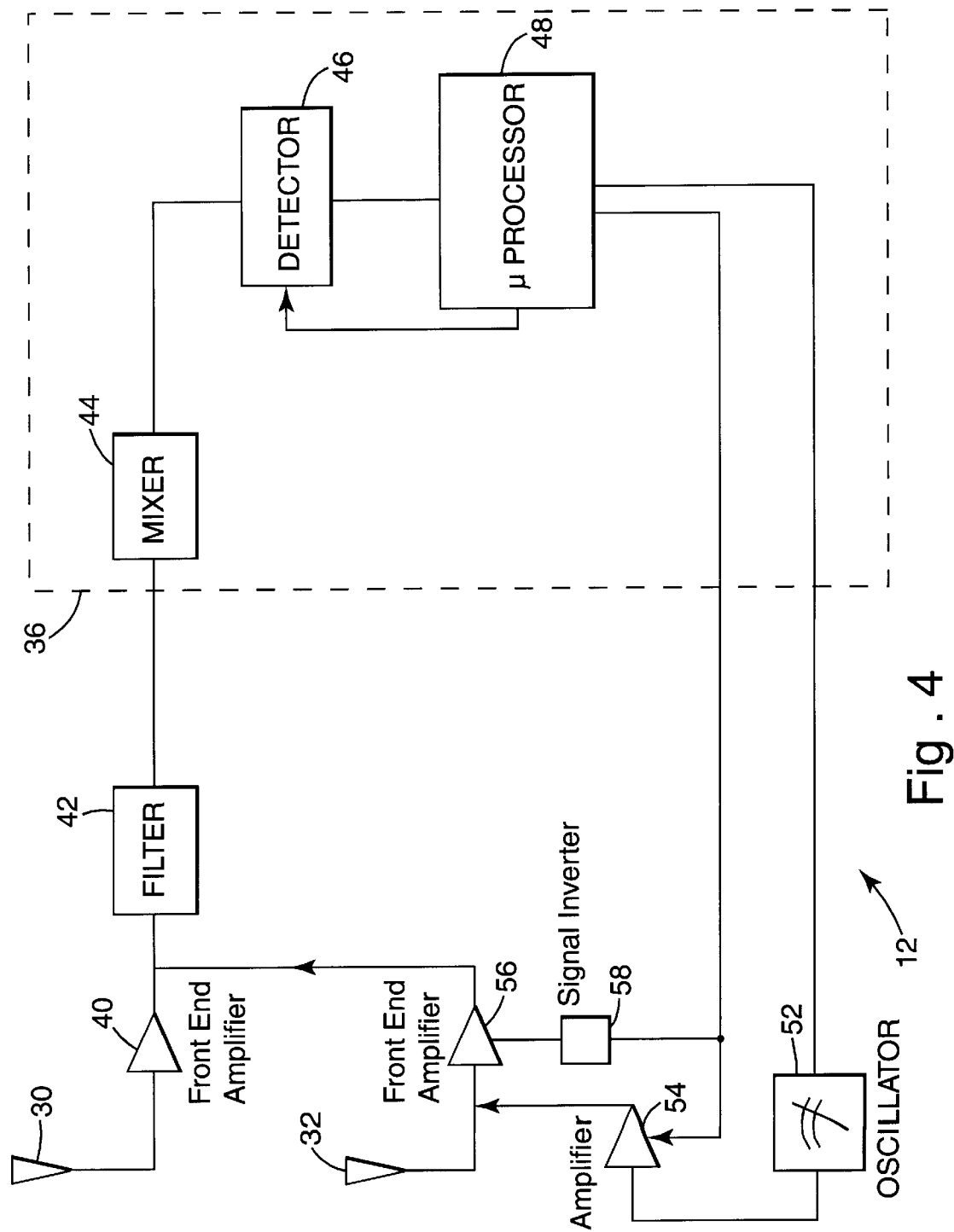
FIG. 4 is a block diagram of the antenna failure detection system of FIG. 3 in greater detail.

FIG. 4 is a block diagram of the antenna failure detection system of FIG. 3 in greater detail. As shown in FIG. 4, signals can be received by system controller 12 via antenna 30, amplified by front end amplifier 40, and filtered by filter 42 to remove noise from the signal. The output of filter 42 is a signal directly proportional to the signal received via antenna 30, and is relayed to control circuit 36.

Control circuit 36 may include mixer 44, detector 46, and microprocessor 48. Mixer 44 demodulates and steps down the frequency of signals received by receiver 34. In one embodiment, mixer 46 demodulates the signal and steps down the frequency from on the order of 433 MHz to on the order of 15 MHz. The output of mixer 44, typically an analog signal, is provided to detector 46. Detector 46, directed by microprocessor 48, compares the parameter of the analog signal to a threshold parameter indicated by microprocessor 48, and generates a digital output to microprocessor 48 reflecting the result of the comparison, i.e. whether the signal received via antenna 30 was greater than or less than the predetermined threshold parameter. In one embodiment, detector 46 is physically distinct from microprocessor 48. In an alternative embodiment, detector 46 is physically integrated with microprocessor 48.

Microprocessor 48 controls the transmission of test signals via antenna 32 by directing the oscillator 52 and amplifier 54. Microprocessor 48 controls the oscillation rate of oscillator 52, and turns amplifier 54 on and off to accomplish transmission of a test signal via antenna 32. In one embodiment, microprocessor 48 alternately turns amplifier 54 on and off for 500 microseconds at a time. Microprocessor 48 also controls front end amplifier 56 in order to prevent signals from being received via antenna 32 while signals are being transmitted via antenna 32. Signal inverter 58 may be employed for this purpose. In the embodiment shown in FIG. 4, antennas 30 and 32 are both used for the reception of operating signals sent by a transmitter 14, 16 associated with a sensor 18, 20. In an alternative embodiment, front end amplifier 56 may be turned off permanently or removed from the circuitry so that signals cannot be received via antenna 32. In yet another alternative embodiment, antenna 30 may be configured so as to transmit signals communicating information to the sensor-transmitter units.

Microprocessor 48 directs the transmission of the test signal, and determines the threshold. In one embodiment, a threshold is preset at the factory, before installation of control panel 26, based on test signals transmitted via antenna 32 and received via antenna 30, measured at the factory. The preset threshold also may be based on a predetermined nominal value, without measuring test signals at the factory. A margin for error may be chosen in determining the threshold. This margin can be directly built in to the threshold (for example, by changing the value of the threshold) or the margin can be taken into account during the comparison to the test signal. The threshold can be determined a number of ways, such as by discrete logic circuitry or by programming the microprocessor. The threshold also can be determined at one of any number of points in time. In one embodiment, the threshold is set by the installer during control panel installation, by measuring the reception of test signals received via antenna 32 and accordingly adjusting the threshold manually. The threshold set by the installer may override any factory-preset threshold. An advantage of this embodiment is that the threshold is set in the approximate environment in which the wireless security system 10 will be operating. In another embodiment, microprocessor 48 automatically adjusts the threshold based on periodic tests during normal operation of wireless security system 10. Such on-the-fly adjustment accounts for changes in the operating environment of wireless security system 10, such as the introduction of interfering or reflecting properties in the environment near control panel 26 which may affect the reception of test signals.

Microprocessor 48 evaluates the output of detector 46 indicating whether the parameter of the test signal received is outside the acceptable range of the threshold parameter, and starts a failure count if the output of detector 46 indicates that the parameter of the test signal received was outside the threshold range. In one embodiment, multiple failures must occur before microprocessor 48 generates a tamper message. After the required number of failures have occurred, microprocessor 48 generates a tamper message and directs the transmission of the tamper message to central station 22, thereby notifying central station 22 that antenna 30 and/or antenna 32 have been tampered with or otherwise disabled.

FIG. 5 is a flow diagram illustrating operation of an antenna failure detection system and method in one particular embodiment of the invention. Initially, at step 60, the microprocessor evaluates the output of detector 46 indicating whether the test signal received is greater than the threshold. If the answer is no, the microprocessor sets a failure flag indicating a failure of the antennas. First, however, in step 62 the microprocessor determines whether the failure flag has already been set as a result of a previous comparison. If the flag is clear, indicating no previous failures, the microprocessor sets the flag at step 64 to indicate an initial failure. A failure count is then started at step 66. In one embodiment, five consecutive failures must occur in order for a tamper message to be generated. Thus, at step 66 the failure count is set at four, and will count down to zero. At step 62, if the failure flag was not clear upon reception of a signal not greater than the threshold, then the failure count at step 68 is decremented by one.

At step 70, the microprocessor checks whether the failure count is now at zero. If not, microprocessor 48 merely waits for the next test signal. If the next test signal received at step 60 is greater than the threshold, then the failure flag is cleared at step 72, and the failure count will start over at four, at step 66, the next time a failure occurs. If the failure count at step 70 reaches zero, indicating five consecutive failures, microprocessor 48 sets the failure bit at step 74 and generates a tamper message at step 76.

A number of embodiments of the present invention have been described. Nevertheless, it will be understood that various modifications may be made without departing from the spirit and scope of the invention. Accordingly, other embodiments are within the scope of the following claims.

What is claimed is:

1. A system for detecting failure of an antenna, comprising:

a first antenna;

a transmitter, operatively coupled to the first antenna, for transmitting a test signal via the first antenna;

a second antenna;

a receiver, operatively coupled to the second antenna, for receiving via the second antenna the test signal transmitted via the first antenna; and a control circuit operatively coupled to the transmitter and the receiver, the control circuit causing the transmitter to transmit the test signal via the first antenna, comparing a parameter of the test signal received by the receiver via the second antenna to a threshold parameter, and generating a message indicative of antenna failure when the parameter of the test signal received by the receiver differs from the threshold parameter by a predetermined amount.

2. The system of claim 1, wherein the parameter is a function of signal power.

3. The system of claim 1, wherein the parameter is a function of signal voltage.

4. The system of claim 1, wherein the test signal is a radio frequency signal.

5. The system of claim 1, wherein the control circuit causes the transmitter to successively transmit a plurality of test signals via the first antenna, initiates a comparison of the parameter of each of the plurality of test signals received by the receiver via the second antenna to the threshold parameter, and generates the message indicative of antenna failure based on the comparison of the parameter of each of the plurality of test signals received by the receiver to the threshold parameter.

6. The system of claim 5, wherein the plurality of test signals are transmitted at pseudo-random time intervals.

7. The system of claim 1, wherein the receiver and the second antenna are oriented to receive an operating signal originating from a sensor-transmitter unit, and the control circuit is configured to process the operating signal received by the receiver.

8. The system of claim 7, wherein the control circuit prevents transmission of the test signal by the transmitter while the operating signal is received by the receiver.

9. The system of claim 7, wherein the first antenna is operatively coupled to the receiver, and the first antenna and the receiver are oriented to receive the operating signal originating from the sensor-transmitter unit.

10. The system of claim 7, additionally comprising a third antenna operatively coupled to the receiver, the third antenna and the receiver being oriented to receive the operating signal originating from the sensor-transmitter unit and being oriented to receive the test signal transmitted via the first antenna.

11. The system of claim 1, wherein each of the first and second antennas are mounted on a control panel in a security system.

12. The system of claim 1, wherein the first antenna is positioned not more than two feet from the second antenna.

13. The system of claim 1, wherein the control circuit includes a microprocessor.

14. The system of claim 1, wherein at least one of the first and second antennas is contained in a non-metallic enclosure.

15. The system of claim 14, wherein the control circuit is arranged on a printed circuit board, and at least one of the first and second antennas is arranged on the printed circuit board.

16. The system of claim 1, wherein the transmitter and the first antenna are oriented to transmit control or status messages to a sensor-transceiver unit.

17. An apparatus for detecting failure of an antenna, comprising:
   means for controlling the transmission of a test signal via a first antenna;
   means for receiving via a second antenna the test signal transmitted via the first antenna;
   means for comparing a parameter of the test signal received via the second antenna to a threshold parameter; and
   means for generating a message indicative of antenna failure, wherein the apparatus generates the message indicative of antenna failure when the parameter of the test signal received differs from the threshold parameter by a predetermined amount.

18. The apparatus of claim 17, wherein the parameter of the test signal is a function of signal power.

19. The apparatus of claim 17, wherein the parameter of the test signal is a function of signal amplitude.

20. The apparatus of claim 17, wherein the test signal is a radio frequency signal.

21. The apparatus of claim 17, wherein the means for controlling transmission of the test signal comprises:
   an oscillator for generating the test signal at a desired frequency;
   a microprocessor; and
   an amplifier coupled to the oscillator, the first antenna, and the microprocessor, the microprocessor being configured to turn the amplifier on and off.

22. An apparatus for detecting failure of an antenna, comprising:
   means for controlling the transmission of a test signal via a first antenna;
   means for receiving via a second antenna the test signal transmitted via the first antenna;
   means for comparing a parameter of the test signal received via the second antenna to a threshold parameter;
   means for generating a message indicative of antenna failure; and
   means for receiving an operating signal from a sensor-transmitter unit.

23. An apparatus for detecting an alarm signal indicative of an alarm condition and reporting the alarm condition to a central station, comprising:
   a first antenna;
   a transmitter operatively coupled to the first antenna;
   a second antenna;
   a receiver operatively coupled to the second antenna, the receiver and the second antenna being oriented to receive the alarm signal indicative of an alarm condition; and
   a central processing unit operatively coupled to the transmitter and the receiver, the central processing unit processing the alarm signal and reporting the alarm condition to a central station, and the central processing unit causing the transmitter to transmit a test signal via the first antenna and reporting to the central station a condition indicating antenna failure when a parameter of a corresponding test signal received by the receiver differs from a threshold parameter by a predetermined amount.

24. The apparatus of claim 23, wherein each of the test and the alarm signals are radio frequency signals.

25. The apparatus of claim 23, wherein the central processing unit causes the transmitter to successively transmit a plurality of test signals via the first antenna, and reports to the central station the condition indicating antenna failure when the parameter of each of a plurality of corresponding test signals received by the receiver differs from the threshold parameter by a predetermined amount.

26. The apparatus of claim 23, wherein the central processing unit causes the transmitter to successively transmit a plurality of test signals via the first antenna, performs an arithmetic operation on the parameters of the plurality of test signals received by the receiver, and reports to the central station the condition indicating antenna failure when the result of the arithmetic operation differs from the threshold parameter by a predetermined amount.

27. The apparatus of claim 26, wherein the arithmetic operation performed on the parameters is computing the mean value of the parameters.

28. The apparatus of claim 23, wherein the receiver and the second antenna are oriented to receive an operating signal from a sensor-transmitter unit, and the central processing unit is configured to process the operating signal received.

29. The apparatus of claim 28, wherein the central processing unit prevents the test signal from being transmitted via the first antenna while the operating signal is being received.

30. The apparatus of claim 23, wherein the threshold parameter is based on a prior measurement of the test signal received by the receiver.

31. The apparatus of claim 23, wherein each of the first and second antennas are mounted on a control panel in a security system.

32. The apparatus of claim 23, wherein at least one of the first and second antennas is contained in a non-metallic enclosure.

33. A method of detecting failure of an antenna, comprising:

transmitting a test signal via a first antenna;

receiving the test signal via a second antenna;

comparing a parameter of the test signal received via the second antenna to a threshold parameter; and generating a message indicative of antenna failure when the parameter of the test signal received differs from the threshold parameter by a predetermined amount.

34. The method of claim 33, further comprising successively transmitting a plurality of test signals via the first antenna, and generating the message indicative of antenna failure when the parameter of each of the plurality of successive test signals received by the receiver differs from the threshold parameter by a predetermined amount.

35. The method of claim 33, further comprising successively transmitting a plurality of test signals via the first antenna, performing an arithmetic operation on the parameters of the plurality of test signals received by the receiver, and generating the message indicative of antenna failure when the result of the arithmetic operation differs from the threshold parameter by a predetermined amount.

36. The method of claim 35, wherein the arithmetic operation performed on the parameters is computing the mean value of the parameters.

37. The method of claim 33, wherein the second antenna is oriented to receive an operating signal from a sensor-transmitter unit.

38. The method of claim 37, wherein the step of transmitting a test signal via a first antenna is prevented for the time during which the second antenna receives the operating signal.

39. The method of claim 33, the method further comprising mounting each of the first and second antennas on a control panel in a security system.

40. The method of claim 33, wherein the threshold parameter is determined by a method comprising:

transmitting an initial test signal via the first antenna;

receiving the initial test signal via the second antenna; and measuring the parameter of the initial test signal received via the second antenna.

41. The method of claim 40, wherein each of the first and second antennas are mounted on a control panel for use with a security system, and the method for determining the threshold parameter is performed when the control panel is installed.

42. The method of claim 41, wherein a human initiates the performance of the method for determining the threshold parameter.

43. The method of claim 41, wherein a nominal value for the threshold parameter is preset prior to installation of the control panel.

44. The method of claim 43, wherein the nominal value is replaced by a result of performing the method for determining the threshold parameter when the control panel is installed.

45. The method of claim 40, wherein the first and second antennas are operatively coupled to a system controller, and the threshold parameter is determined by the system controller.

46. An apparatus for detecting alarm signals indicative of an alarm condition and reporting the alarm condition to a central station, comprising:

a control panel;

a first antenna mounted on the control panel;

a transmitter operatively coupled to the first antenna;

a second antenna mounted on the control panel;

a receiver operatively coupled to the second antenna; and a control circuit mounted on the control panel for controlling the transmission of a test signal by the transmitter, detecting reception of the test signal by the receiver, comparing a parameter of the test signal received to a threshold parameter, and generating a message indicative of antenna failure when the parameter of the test signal received differs from the threshold parameter by a predetermined amount.

47. The apparatus of claim 46, wherein the message indicative of antenna failure is generated when the parameter of each of a plurality of successive test signals received differs from the threshold parameter by a predetermined amount.

48. The apparatus of claim 46, wherein the message indicative of antenna failure is generated when an arithmetic function of the parameters of each of a plurality of successive test signals received differs from the threshold parameter by a predetermined amount.

49. The apparatus of claim 48, wherein the arithmetic function is mean value.

50. A wireless security system comprising:

a control panel;

one or more security sensors that detect security events and transmit alarm signals to the control panel;

a first antenna mounted on the control panel;

a second antenna mounted on the control panel, at least one of the first and second antennas receiving the alarm signals from the security sensors;

a transmitter coupled to the first antenna;

a receiver coupled to the second antenna; and a control circuit mounted on the control panel, the control circuit causing transmission of a test signal by the transmitter, detecting reception of the test signal by the receiver, comparing a parameter of the test signal received to a threshold parameter, and generating a message indicative of antenna failure when the parameter of the received test signal differs from the threshold parameter by a predetermined amount.

* * * * *